United States Patent
Park et al.

(10) Patent No.: US 7,590,089 B2
(45) Date of Patent: Sep. 15, 2009

(54) TRANSFER FORMAT SELECTING METHOD FOR OPTIMIZING DATA TRANSFER IN WCDMA MOBILE COMMUNICATION SYSTEM

(75) Inventors: Sung-Wook Park, Yongin-si (KR);
Kang-Gyu Lee, Yongin-si (KR);
Sang-Hoon Chae, Suwon-si (KR);
Jin-Young Oh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 648 days.

(21) Appl. No.: 10/988,734

(22) Filed: Nov. 15, 2004

(65) Prior Publication Data

US 2005/0136919 A1    Jun. 23, 2005

(30) Foreign Application Priority Data

Dec. 22, 2003    (KR) .................... 10-2003-0094670

(51) Int. Cl.
*H04Q 7/00*    (2006.01)
(52) U.S. Cl. ...................... 370/329; 370/469
(58) Field of Classification Search ................. 370/328, 370/335, 338, 342, 401, 252, 329, 469
See application file for complete search history.

(56) References Cited

U.S. PATENT DOCUMENTS 6,850,540 B1 *    2/2005    Peisa et al. .................. 370/468

2002/0097695 A1 *    7/2002    Herrmann .................... 370/329
2003/0007517 A1 *    1/2003    Beckmann et al. .......... 370/537
2004/0008659 A1 *    1/2004    Kim .......................... 370/342

FOREIGN PATENT DOCUMENTS

| EP | 1 349 322 | 10/2003 |
| JP | 2002-198973 | 7/2002 |
| WO | WO 02/096030 | 11/2002 |

* cited by examiner

*Primary Examiner*—Ricky Ngo
*Assistant Examiner*—Christine Ng
(74) *Attorney, Agent, or Firm*—The Farrell Law Firm, LLP

(57) ABSTRACT

Disclosed is a method for selecting transport formats corresponding to transport channels in a wideband code division multiple access mobile communication system. The method includes the steps of sorting a logical channels according to priorities, the logical channels existing between a radio link control layer entity and a medium access control layer entity; sorting transport format indicators indicating the transport formats according to a number of transport blocks for each corresponding transport format; and according to a sequence of the sorted transport format indicators, selecting transport formats supporting transport blocks of a transport format indicator, a number of which is less than or equal to a number of data blocks to be transferred through a logical channel according to each priority; and comparing size of the data blocks to be transferred with sizes of transport blocks of a selected transport format indicator and selecting a transport format indicator having sizes of a transport block identical to sizes of the data blocks to be transferred.

2 Claims, 7 Drawing Sheets

| LOGICAL CHANNEL | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| PRIORITY | 1 | 4 | 5 | 3 | 2 | 1 | 6 | 5 | 8 | 2 | 3 | 5 | 2 | 7 | 8 |

FIG.4A

| PRIORITY | 1 | 2 | 3 | 4 | 5 | 6 | 7 | 8 |
|---|---|---|---|---|---|---|---|---|
| THE NUMBER OF LOGICAL CHANNEL | 2 | 3 | 2 | 1 | 3 | 1 | 1 | 2 |

FIG.4B

| PRIORITY | 1 | 2 | 3 | 4 | 5 | 6 | 7 | 8 |
|---|---|---|---|---|---|---|---|---|
| THE NUMBER OF ACCUMULATED LOGICAL CHANNEL | 2 | 5 | 7 | 8 | 11 | 12 | 13 | 15 |

FIG.4C

| INDEX | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| LOGICAL CHANNEL ID | 5 | 0 | 12 | 9 | 4 | 10 | 3 | 1 | 11 | 7 | 2 | 6 | 13 | 14 | 8 |

FIG.4D

| TFI | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| THE NUMBER OF TRANSPORT BLOCKS | 1 | 15 | 4 | 5 | 3 | 2 | 1 | 6 | 5 | 8 | 2 | 3 | 5 | 2 | 7 | 8 | 2 | 1 |

FIG.5A

| INDEX | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| TFI | 1 | 15 | 9 | 14 | 7 | 12 | 8 | 3 | 2 | 11 | 4 | 16 | 13 | 10 | 5 | 17 | 6 | 0 |
| THE NUMBER OF TRANSPORT BLOCKS | 15 | 8 | 8 | 7 | 6 | 5 | 5 | 5 | 4 | 3 | 2 | 2 | 2 | 2 | 2 | 1 | 1 | 1 |

FIG.5B

TRANSFER FORMAT SELECTING METHOD FOR OPTIMIZING DATA TRANSFER IN WCDMA MOBILE COMMUNICATION SYSTEM

PRIORITY

This application claims priority to an application entitled "Transfer Format Selecting Method For Optimizing Data Transfer In CDMA Mobile Communication System" filed in the Korean Intellectual Property Office on Dec. 22, 2003 and assigned Serial No. 2003-94670, the contents of which are incorporated herein by reference.

BACKGROUND OF THE INVENTION

1. Field of the Invention

The present invention relates to a WCDMA mobile communication system, and more particularly to a transfer format selecting method for optimizing data transfer.

2. Description of the Related Art

In general, wideband code division multiple access (WCDMA) communication systems can be classified into synchronous systems and asynchronous systems. The asynchronous systems include a Universal Mobile Terrestrial System ("UMTS"). A structure of the UMTS communication system will be described with reference to FIG. 1.

FIG. 1 is a block diagram showing a structure of a general UMTS communication system. Referring to FIG. 1, the UMTS communication system includes a core network ("CN") 100, a plurality of radio network subsystems ("RNSs") 110 and 120, and user equipment ("UE") 130. The RNSs 110 and 120 include a radio network controller ("RNC") and a plurality of base stations (Node Bs) ("base station", "Node B" or "cell"). For example, the RNS 110 and the RNC 111 include a plurality of Node Bs 113 and 115. Such RNCs are classified into serving RNCs ("SRNCs"), drift RNCs ("DRNCs"), and controlling RNCs ("CRNCs") according to the functions of the RNCs. The SRNCs and the DRNCs are classified depending on the functions of the RNCs for UEs. If a certain RNC manages information of a certain UE and transfers data of the UE to the CN, the RNC is the SRNC of the UE. If the data of a certain UE is transferred/received to/from the SRNC via another RNC instead of being directly transferred/received to/from the SRNC, the RNC is the DRNC of the UE. In addition, the CRNC represents an RNC for controlling the Node Bs. For example, as shown in FIG. 1, if the RNC 111 manages the information of a UE 130, the RNC 111 is the SRNC. Also, if the UE 130 transmits/receives data thereof to/from an RNC 112 while the UE 130 is moving, the RNC 112 is the DRNC. In addition, the RNC 111 controlling the Node B 113 is the CRNC of the Node B 113. Layer and channel structures of a UMTS will be described with reference to FIG. 2.

FIG. 2 is a block diagram illustrating the layer structure of a general wideband code division multiple access mobile communication system. First, referring to FIG. 2, a Radio Resource Control ("RRC") layer 141 transmits a control message for a transport format selection to a Medium Access Control ("MAC") layer 145. In this case, the RRC layer 141 transmits not only the control message for the transport format selection but also transmits a plurality of control messages for controlling the operation of the MAC layer 145. Further, a Radio Link Control ("RLC") layer 143 receives a Service Data Unit (SDU) from a higher layer and compares the received service data unit with a Protocol Data Unit (PDU). When the received service data unit is smaller than the protocol data unit, the RLC layer 143 concatenates the received service data unit with other service data units, so as to generate a protocol data unit having a size suitable for the protocol data unit. In contrast, when the received service data unit is larger than the protocol data unit, the RLC layer 143 segments the received service data, so as to generate a protocol data unit having a size suitable for the protocol data unit. Further, the RLC layer 143 transfers the generated protocol data units to the MAC layer 145 through a logical channel.

The UMTS channels can be classified into physical channels, transport channels, and logical channels. The physical channels include downlink channels such as a Physical Downlink Shared Channel (PDSCH), a Dedicated Physical Control Channel (DPCCH), and a Dedicated Physical Data Channel (DPDCH), and uplink channels such as a Dedicated Physical Channel (DPCH). The logical channels can be represented by Dedicated Channels (DCHs) which includes a Dedicated Control Channel (DCCH) and a Dedicated Traffic Channel (DTCH). The transport channels include a Random Access Channel (RACH) and a Common Packet Channel (CPCH).

Meanwhile, the MAC layer 145 receives a Transport Block Set (TBS) from the physical layer (PHY) 147, divides the received transport block set into Transport Blocks (TBs), converts the divided transport blocks into protocol data units, and transfers the protocol data units to the RLC layer 143. Then, the RLC layer 143 converts the received protocol data units into service data units and transfers the service data units to the higher layer. In contrast, the MAC layer 145 receives a protocol data unit from the RLC layer 143, divides the received protocol data unit into transport blocks which are real units transmitted through the transport channel, and transfers the transport blocks to the physical layer 147. The physical layer 147 converts the transport blocks received from the MAC layer 145 into radio frames which are real units transmitted from the physical layer, and transmits the radio frames over the air through a corresponding physical channel.

Primitives are utilized in the data transmission between the layers described above, that is, the RRC layer 141, the RLC layer 143, and the physical layer 147, and buffers for storing data, such as a shared memory, are interposed between the MAC layer 145 and the RLC layer 143 and/or between the MAC layer 145 and the physical layer 147. The RLC layer 143 converts the service data units received from the higher layer into the protocol data units, buffers the protocol data units into a Dedicated Control Channel/Dedicated Transport Channel (DCCH/DTCH) buffer 149, and reports the buffering to the MAC layer 145 through the primitives. Whenever it is necessary to read the protocol data units, the MAC layer 145 reads the protocol data units stored in the DCCH/DTCH buffer 149 and maps them onto the transport channel. When necessary or when the MAC layer 145 receives the primitives from other layers, the MAC layer 145 reads the protocol data units stored in the DCCH/DTCH buffer 149 and maps them onto the transport channel, generates the transport blocks by multiplexing and adding headers of the MAC layer 145 according to the type of the mapped transport channel, and transmits the data to L1 (Layer 1) for the transport channel. Further, the MAC layer 145 buffers the generated transport blocks into the transport channel buffer 151. At a point of time when the transport blocks must be transmitted, the physical layer 147 reads and transmits the transport blocks stored in the transport channel buffer 151.

Transport blocks transmitted through the same single transport channel during one Transmission Time Interval ("TTI") will be referred to as a "Transport Block Set" (TBS), the number of bits in each transport block of the TBS will be referred to as a "transport block size", and the number of the transport blocks constituting the TBS will be referred to as "Transport Block Set Size" (TBSS). In this case, a Node B reports the transport block set size to a User Equipment ("UE"), so that the number of bits that are rate-matched in a physical layer of the UE can be estimated. In this case, the rate matching scheme is information indicating how repetition or puncturing has been performed when the physical layer of the UE has repeated or punctured with respect to the UE data. As described above, the UE can simultaneously set a plurality of transport channels corresponding to its transmission characteristics (for example, transport channels capable of providing various error correction functions). Each of the transport channels may be utilized in transmitting the information stream of one radio bearer or in transmitting L2 (Layer 2) and higher layer signaling messages. This mapping and transmitting of the transport channels onto and through the same or different physical channels is implemented by the physical channel mapping operation of the physical channel 147.

The characteristics of the transport channels are determined according to the channel coding scheme employed in the transport channel, such as a convolutional coding scheme, and the Transport Format (TF) or the Transport Format Set (TFS) which defines the processing in the physical layer, such as interleaving and service-specific rate matching. The transport format is a set whose members are data processing schemes of the physical layer for the transport channel, and the transport channel usually defines the coding rate and the channel coding scheme by and in which the data transmitted through the corresponding transport channel have been coded, the size (transport block size) by which the data are divided and transmitted, and the number of transport blocks which can be transmitted during one TTI. The timing of the transport blocks is fixed to the frame timing of the physical layer 147, that is L1 (Layer 1). For example, the transport block is generated at every 10 ms, that is, at every point of time which corresponds to a product obtained by multiplying 10 ms by an integer. Therefore, two different transport channels have different details in relation to the transport channels, which means different transport formats.

The transport format can be divided into two parts including a dynamic part and a semi-static part, as shown in Table 1.

TABLE 1

| Transport Format type | Attributes |
| --- | --- |
| Dynamic | Transport Block size |
|  | TBS size |
| Semic-static | TTI |
|  | Error protection scheme |
|  | Type of error protection, turbo code, |
|  | convolutional code or channel coding |
|  | Coding rate |
|  | Size of CRC |

As shown in Table 1, the dynamic part includes information related to a transport block size and a transport block set size. The semi-static part includes information of the TTI, size of Cyclic Redundancy Check (CRC), and error protection scheme which includes a coding rate and a channel coding scheme for error protection. As described above, a transport format is assigned to each of the transport channels according to the characteristics of the mapped physical channel. In this case, the Transport Format Set (TFS) is a set whose members are all transport formats which can be assigned to the transport channels, and the Transport Format Indicator (TFI) is an identifier for identifying each element constituting the transport format set, that is, each of the transport formats. The semi-static parts of all of the transport formats are equal to the semi-static parts existing in the transport format set. Further, the transport block size and the transport block set size information contained in the dynamic part are generated corresponding to the bit rate of the transport channel. When the bit rate of the transport channel changes according to channel environments and/or service types, only the transport block set size or both of the transport block set and the transport block set size can be changed. In this case, when the transmission rate of the transport channel is fixed or changes slowly, the transport format is mapped to the transport channel. In contrast, when the transmission rate of the transport channel rapidly changes, the transport format set is mapped to the transport channel.

The Transport Format Combination (TFC) is a combination of the transport formats transmitted to the physical layer 147 through a Coded Composite Transport Channel (CCTrCH) of the UE, which has one transport format for each transport channel, and the Transport Format Combination Set (TFCS) is a set of the TFCs transmitted through the CCTrCH. In this case, the TFCS needs not include all of the TFCs of the corresponding transport channels. Since a plurality of TFCSs are generated, the Transport Format Combination Indicators (TFCIs) are necessary in order to identify the TFCI being currently assigned to the transport channel. Therefore, when a transmitting-side of the communication entity, e.g., a Node B, transmits a transport channel with a TFCI which corresponds and is mapped to the transport channel, a receiving-side of the communication entity, e.g., a UE, can decode and demultiplex the transport channel by analyzing the TFCI of the transport channel.

Since a plurality of transport channels can be time-division-multiplexed through the same physical channel, the UE should be capable of recognizing the transport channel to which the physical channel received at a predetermined point of time pertains. Therefore, the UE provides an indicator to each of the transport channels in order to differentiate and identify the transport channels. This indicator is the Transport Channel Indicator (TCI).

Whenever the RLC layer 143 transmits a data request signal, the RRC layer 141 transmits a control signal for selecting a transport format assigned to the transport channel construction to the MAC layer 145. The RRC layer 141 assigns values of priorities, for example '1' to '8', to a plurality of logical channels, for example 8 logical channels, between the RLC layer 143 and the MAC layer 145, so as to control scheduling of the uplink data. From among the priorities, '1' is a value having the highest priority and '8' is a value having the lowest priority. The selection of TFCs in the UE depends on the priorites assigned to the logical channels by the RRC layer 141. Whenever the RLC layer 143 transmits a data request signal, the MAC layer 145 selects a proper transport format for the data transmission under the control of the RRC layer 141. During the transmission according to the priority, some of the transport blocks from among the transport blocks of each of the logical channels may be blocked and delayed by the data transmission of another logical channel having a higher priority. This blocking of the transport blocks for the data transmission of another logical channel is also implemented under the control of the RRC layer 141, and the priority of the interrupted transport blocks is set to be '0' which is higher than the highest priority '1', so that the data having the priority of '0' can be transmitted prior to any other transport blocks.

When the UE transmit power approaches the maximum transmit power which can be transmitted by the UE, and the internal loop for power control cannot be maintained any more due to a coverage problem, the UE assigns a transport format combination having a bit rate lower than that of the current transport format combination to the transport channel. When a bit rate of a logical channel which transfers data from a CODEC supporting the variable rate operation conflicts with the lower bit rate, the bit rate of the CODEC is changed in order to avoid the confliction. Further, the UE continuously measures whether or not the maximum transmit power of the UE can support the temporarily interrupted transport format combination. As a result of the measurement, when the maximum transmit power of the UE is enough to support the temporarily interrupted transport format combination, transport combinations are assigned to the transport channels in reconsideration of the temporarily interrupted transport format combination.

As described above, the MAC layer 145 performs transport format selection in response only to the data transmission request of the RLC layer 143, has a transport format table including all transport formats which can be assigned for the transport format selection, and searches the transport format table under the control of the RRC layer 141 when data transmission is requested by the RLC layer 143, so as to select a transport format for the corresponding transport channel. However, searching the transport format table which includes transport formats of all cases in order to assign a transport format to one transport channel requires considerable amount of time spent in the transport format selection and may cause an overload due to the time required for the transport format selection.

SUMMARY OF THE INVENTION

Accordingly, the present invention has been made to solve at least the above-mentioned problems occurring in the prior art, and a first object of the present invention is to provide a method for minimizing a selection time for a transfer format search by selecting a transfer format for optimizing the data transfer in a WCDMA mobile communication system.

A second object of the present invention is to provide a method for improving a data transmission rate by selecting a transfer format having the highest data transmission rate from among transfer formats assigned to terminals.

In order to accomplish these objects, there is provided a method for selecting transport formats corresponding to transport channels in a wideband code division multiple access mobile communication system which includes a radio link control layer entity and a medium access control layer entity, the radio link control layer entity converting a service data unit delivered from an upper layer into a protocol data unit and transmitting the protocol data unit to the medium access control layer entity through a predetermined logical channel from among a plurality of logical channels, the medium access control layer entity receiving the protocol data unit and converting the protocol data unit into a transport block and transferring the transport block to a physical layer entity through a predetermined transport channel from among a plurality of transport channels, the method including the steps of sorting logical channels according to priorities, the logical channels existing between a radio link control layer entity and a medium access control layer entity; sorting transport format indicators indicating the transport formats according to a number of transport blocks for each corresponding transport format; and according to a sequence of the sorted transport format indicators, selecting transport formats supporting transport blocks of a transport format indicator, a number of which is less than or equal to a number of data blocks to be transferred through the logical channel according to each priority; and comparing the size of the data blocks to be transferred with sizes of transport blocks of a selected transport format indicator and selecting a transport format indicator having sizes of a transport block equal to sizes of the data blocks to be transferred.

BRIEF DESCRIPTION OF THE DRAWINGS

The above and other objects, features and advantages of the present invention will be more apparent from the following detailed description taken in conjunction with the accompanying drawings, in which:

FIGS. 4A to 4D show an example of a process for sorting logical channels on the basis of each priority thereof according to one embodiment of the present invention; and FIGS. 5A to 5B show an example of a process for sorting transfer format indicators on the basis of the number of transfer blocks according to one embodiment of the present invention.

DETAILED DESCRIPTION OF THE PREFERRED EMBODIMENT

Figure 1:
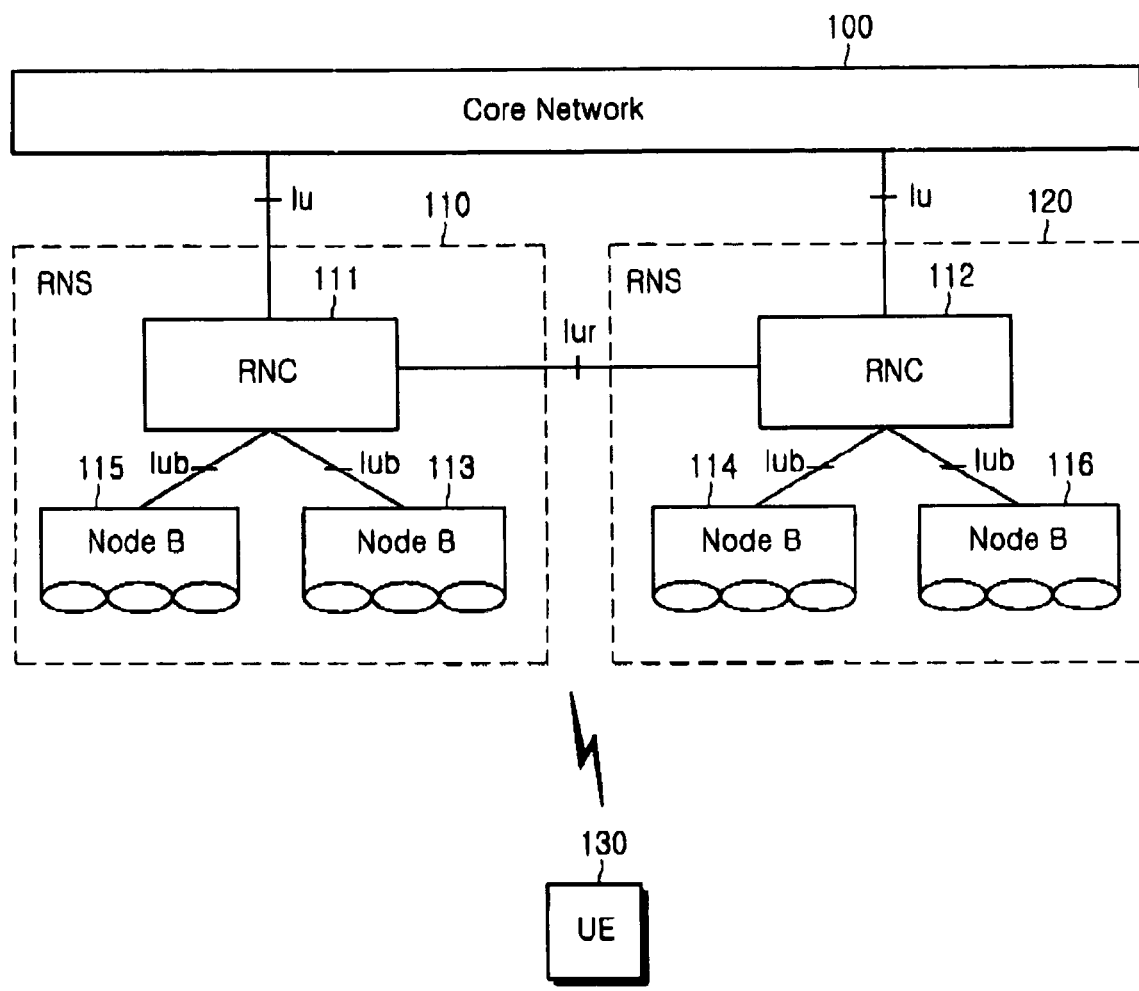
FIG. 1 is a block diagram showing a structure of a general UMTS communication system.

Hereinafter, one preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may obscure the subject matter of the present invention.

A layer structure of a WCDMA mobile communication system will be described again with reference to FIG. 2. As described with reference to FIG. 2, first, a Radio Link Control (RLC) layer 143 receives a Service Data Unit (SDU) from a higher layer and compares the received service data unit with a Protocol Data Unit (PDU). When the received service data unit is smaller than the protocol data unit, the RLC layer 143 concatenates the received service data unit with other service data units, so as to generate a protocol data unit having a size suitable for the protocol data unit. In contrast, when the received service data unit is larger than the protocol data unit, the RLC layer 143 segments the received service data, so as to generate a protocol data unit having a size suitable for the protocol data unit. Also, the RLC layer 143 transfers the generated protocol data units to a medium access control (MAC) layer 145 through logical channels. The MAC layer 145 having received the protocol data unit from the RLC layer 143 divides the received protocol data unit into transport blocks which are real units transmitted through the transport channel, and transfers the transport blocks to a physical layer 147. The physical layer 147 converts the transport blocks received from the MAC layer 145 into radio frames which are real units transmitted from the physical layer, and transmits the radio frames over the air through a corresponding physical channel. In this case, the MAC layer 145 buffers the generated transport blocks into the transport channel buffer 151 and reports the buffering to the physical layer 147. The physical layer 147 reads the transport blocks stored in a transport channel buffer 151 and converts them into radio frames which are real units transmitted from the physical layer, according to system requirements.

Figure 2:
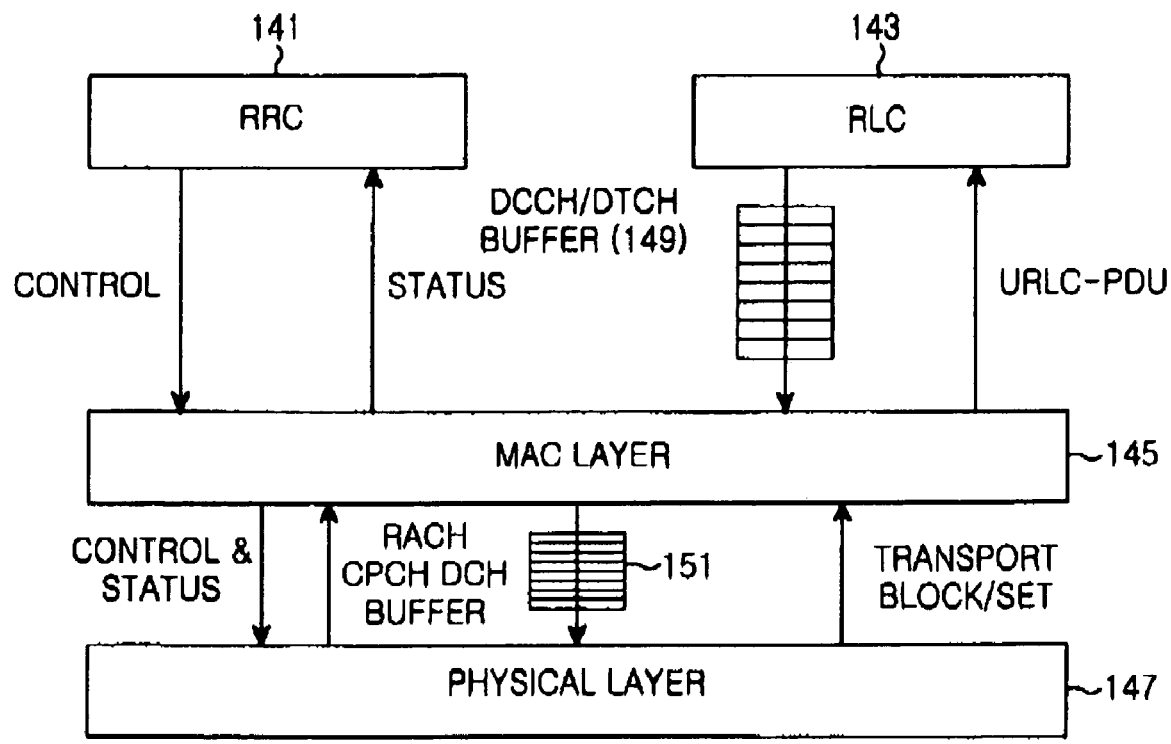
FIG. 2 is a block diagram showing a layer structure of a general WCDMA mobile communication system.

According to the present invention, a wideband code division multiple access (WCDMA) mobile communication system has a structure identical to the layer structure shown in FIG. 2 as described above. However, according to the present invention, different from a conventional technique, the MAC layer 145 does not search the entire transport format table, which stores all allocable transport formats, for a transport format whenever the transport format for a transport channel is selected. According to the present invention, the MAC layer 145 selects transport formats having the size of the transport blocks corresponding to the size of data blocks to be transferred after sorting the logical channels used for transferring the data according to its priority. As a result, the present invention minimizes a search time required for selecting a transport format in the MAC layer. Also, according to the present invention, it is possible to improve a data transmission rate by selecting a transport format having the highest data transmission rate corresponding to the number of data blocks to be transferred from among transport formats assigned for terminals.

Hereinafter, a method for selecting a transport format according to one embodiment of the present invention will be described. The RRC layer 141 assigns priorities to logical channels so as to control the data scheduling. The priorities assigned to the logical channels have a value between '1' and '8', wherein a priority of '1' has the highest priority, and a priority of '8' has the lowest priority.

A UE selects a transport format combination according to each priority of the logical channels assigned by the RRC layer 141. The priorities of the logical channels are fixed. The UE selects the logical channels having a high priority corresponding to service data having a high priority so as to transfer the service data, so that it is possible to optimize a data transmission rate. Accordingly, good quality of service (QoS) is maintained.

A procedure for selecting the transport format combination will be described.

(1) Logical channels between the RLC layer 143 and the MAC 145 layer are sorted according to each priority.

(2) Transport format indicators are sorted in descending order according to the number of transport format blocks for each transport format.

(3) All logical channels are searched, thereby counting the number of transport blocks having the size identical to the size of a transport block for a logical channel having the highest priority.

(4) The transport format indicators are searched in descending order, thereby finding transport format indicators corresponding to the number of the transport blocks to be transferred, as counted in step (3). Then, the transport format indicators corresponding to a transport block having the size identical to the size of a data block to be transferred are selected from the found transport format indicators. At this time, if there are no transport format indicators corresponding to the number of blocks to be transferred, the transport format indicators capable of sending blocks having the greatest number from among numbers less than the number of the blocks to be transferred are selected.

As described above, a rule for selecting a transport format combination in the UE is applied to a dedicated channel from among the transport channels. Also, the rule for selecting the transport format combination can be used for selecting a transport format for a random access channel (RACH) or a common packet channel (CPCH). The procedure for selecting a transport format combination, which has been described above, will be described with reference to FIGS. 3 to 5B.

Figure 3:
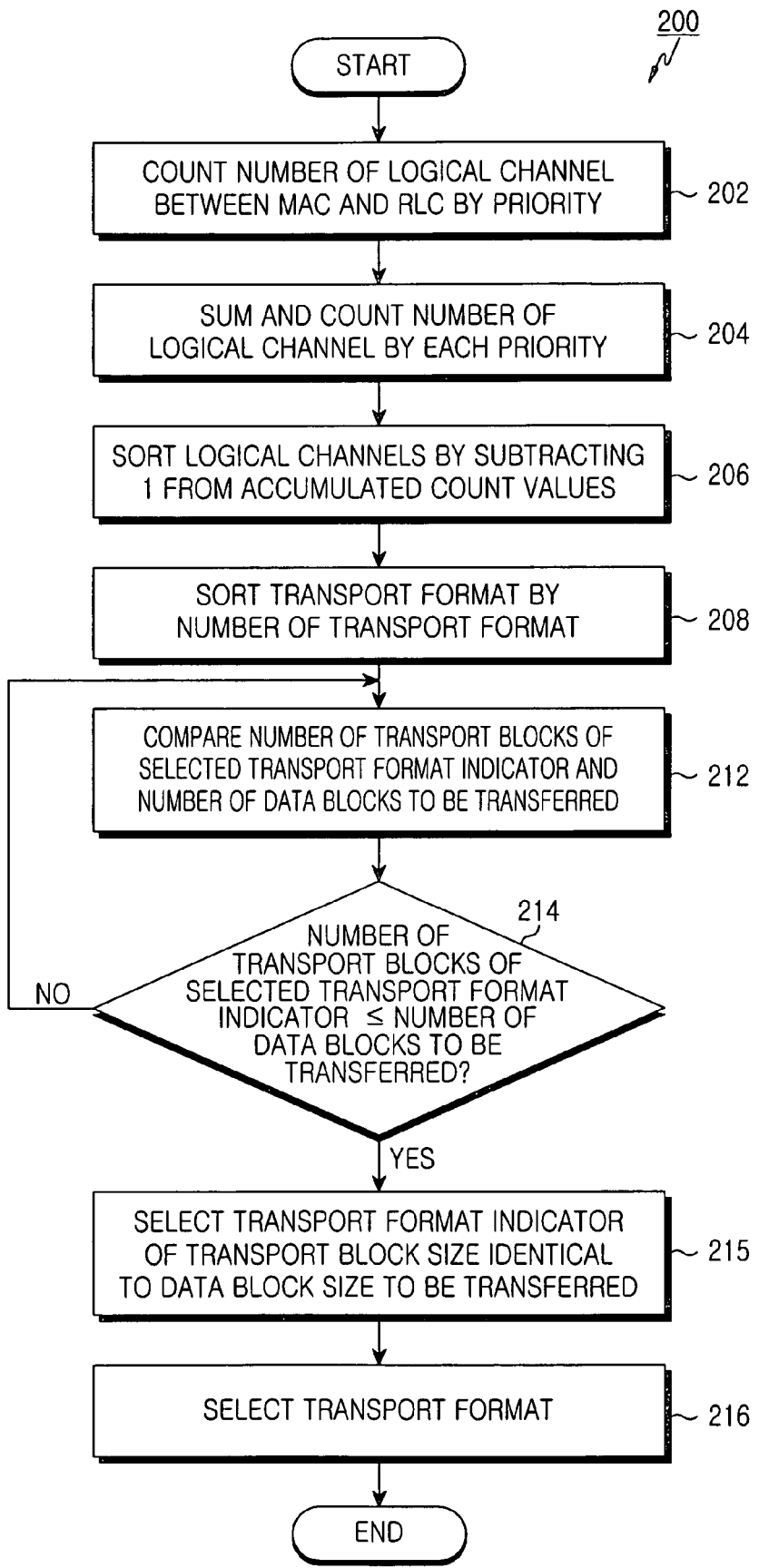
FIG. 3 is a flow chart showing a procedure for selecting a transport format combination according to one embodiment of the present invention.

FIG. 3 is a flow chart showing the procedure for selecting a transport format combination according to one embodiment of the present invention. FIGS. 4A to 4D are views showing an example of a process for sorting logical channels according to priorities thereof according to the present invention. Also, FIGS. 5A to 5B are views showing an example of a process for sorting transport format indicators on the basis of the number of transport blocks according to the present invention.

Referring to FIG. 3, the MAC layer 145 counts the number of logical channels between the MAC layer 145 and the RLC layer 143 according to each priority in step 202 and performs step 204. In detail, as shown in FIG. 4A, logical channels exist between the MAC layer 145 and the RLC layer 143. The MAC layer 145 counts the number of logical channels corresponding to each priority, thereby obtaining information about the number of logical channels corresponding to each priority as shown in FIG. 4B. Subsequently, the MAC layer 145 obtains a number of accumulated logical channels corresponding to each priority in step 204. Specifically, as shown in FIG. 4C, for each of the priorities from '1' to '8', the MAC layer 145 counts a sum of the number of logical channels corresponding to a corresponding priority and the number of all logical channels corresponding to all priorities higher than the corresponding priority, thereby obtaining the number of accumulated logical channels for the corresponding priority, that is, the sum of the numbers of logical channels. For example, the number of logical channels corresponding to the priority '1' is two, and the number of accumulated logical channels corresponding to the priority '1' is two because there are no logical channels having priority higher than the priority '1'. Also, the number of logical channels corresponding to the priority '2' is three, and the accumulated number of logical channels corresponding to the priority '2' is five, which is a resultant value after adding '2' representing the number of logical channels corresponding to the priority '1' to '3' representing the number of logical channels corresponding to the priority '2' because the number of the logical channels corresponding to the priority '2' is three and logical channels having priority higher than the priority '2' are logical channels having the priority '1'.

Also, the MAC layer 145 sorts logical channels corresponding to each priority by subtracting '1' from the accumulated number of logical channels corresponding to each priority in step 206. Furthermore, logical channels corresponding to each priority are sorted by using a resultant value after subtracting '1' from the accumulated number of logical channels corresponding to each priority as an index. That is, the MAC layer 145 determines the index by subtracting '1' from the accumulated number of logical channels corresponding to each priority if the number of logical channels corresponding to each priority is greater than '1'. As described above, an example of a process for sorting logical channels is shown in FIG. 4D. An example of a logical channel of '2' having the priority of '5' will be described with reference to FIGS. 4C and 4D. The priority for the logical channel '2' is five, and the accumulated number of logical channels corresponding to the priority '5' is '11'. Herein, the MAC layer 145 reduces '11' representing the accumulated number of the logical channels corresponding to the priority value '5' to '10', and an ID of a logical channel '2' corresponds to a position of an index '10'. Similarly, regarding an ID of a logical channel '7' corresponding to the priority '5', the MAC layer 145 reduces '10' representing the accumulated number of the logical channel to '9', and an ID of the logical channel '7' corresponds to a position of an index '9'. Accordingly, the IDs of the logical channels are sorted through the above-described method.

The MAC layer 145 performs step 208 to sort the transport format indicators (TFIs) in a descending order according to the number of transport format blocks supported through each transport format. That is, if the MAC layer 145 has information related to the TFIs shown in FIG. 5A, then the MAC layer 145 sorts the TFIs according to the number of transport blocks as shown in FIG. 5b.

Also, the MAC layer 145 performs step 212 to compare the number of transport blocks corresponding to each TFI with the number of data blocks to be transferred through the logical channels according to each priority while searching for the sorted TFIs in the order of the indices. In addition, the MAC layer 145 determines whether or not the number of transport blocks corresponding to each TFI is less than or equal to the number of data blocks to be transferred in step 214. If the number of transport blocks corresponding to each TFI is less than or equal to the number of data blocks to be transferred, the MAC layer 145 selects corresponding transport formats. Then, the MAC layer 145 performs step 215 so as to select a TFI corresponding to the size of the transport block identical to the size of a data block to be transferred after comparing the size of transport blocks corresponding to each TFI with the size of data blocks to be transferred. Subsequently, the MAC layer 145 performs step 216 so as to select a transport format indicated by the selected TFI.

As described above, according to the present invention, when selecting a transport format corresponding to a transport channel in a WCDMA mobile communication system, the transport format is not selected by searching one by one a transport format table that includes all of the allocable transport formats, but the transport format is selected by selecting a transport format having the size of a transport block identical to the size of a data block to be transferred after sorting the logical channels to be transferred according to their priority. It is possible to minimize a search time required for selecting a transport format. As described above, since a search number required for selecting a transport format is minimized, a search time required for selecting a transport format is minimized, so that the system performance is improved. Also, according to the present invention, it is possible to transfer the greatest number of transport blocks capable of being transferred by transferring all of the transport blocks having the size identical to the size of transport blocks transferred through a logical channel having the highest priority. That is, according to the present invention, it is possible to improve a data transmission rate of a mobile communication system by selecting a transport format having the highest data transmission rate.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for selecting transport formats corresponding to transport channels in a wideband code division multiple access mobile communication system which includes a radio link control layer entity and a medium access control layer entity, the radio link control layer entity converting a service data unit delivered from an upper layer into a protocol data unit and transmitting the protocol data unit to the medium access control layer entity through a predetermined logical channel from among a plurality of logical channels, the medium access control layer entity receiving the protocol data unit and converting the protocol data unit into a transport block and transferring the transport block to a physical layer entity through a predetermined transport channel from among a plurality of transport channels, the method comprising the steps of:

i) sorting logical channels according to priorities, the logical channels existing between the radio link control layer entity and the medium access control layer entity;

ii) sorting transport format indicators according to the number of transport blocks for each corresponding transport format; and iii) selecting, according to a sequence of the sorted transport format indicators, transport formats supporting transport blocks of a transport format indicator, a number of which is less than or equal to a number of data blocks to be transferred through a logical channel according to each priority, wherein a transport format supporting the number of transport blocks which is less than the number of data blocks is selected when a transport format supporting the number of transport blocks equal to the number data blocks is unavailable.

2. The method as claimed in claim 1, wherein step i) comprises the steps of:

counting the number of the logical channels according to the priorities;

calculating accumulated count values for the priorities by adding the number of logical channels having a corresponding priority value to the number of all logical channels having a priority higher than the corresponding priority; and sorting the logical channels corresponding to the priorities by subtracting '1' from each of the accumulated count values for each priority.

* * * * *

UNITED STATES PATENT AND TRADEMARK OFFICE
CERTIFICATE OF CORRECTION

PATENT NO.       : 7,590,089 B2                                Page 1 of 1
APPLICATION NO.  : 10/988734
DATED            : September 15, 2009
INVENTOR(S)      : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twenty-first Day of September, 2010

David J. Kappos
*Director of the United States Patent and Trademark Office*